United States Patent [19]

Dalferth et al.

[11] 4,144,709
[45] Mar. 20, 1979

[54] EYED HOOK

[76] Inventors: Hans Dalferth, Haydnstr. 21, 7080 Aalen-Wasseralfingen; Reinhard Smetz, Baldinger Str. 2, 8860 Nördlingen, both of Fed. Rep. of Germany

[21] Appl. No.: 851,829

[22] Filed: Nov. 16, 1977

[30] Foreign Application Priority Data

Nov. 23, 1976 [DE] Fed. Rep. of Germany ....... 2653664

[51] Int. Cl.² .............................................. F16G 15/04
[52] U.S. Cl. .................................. 59/93; 24/230.5 R; 24/241 P; 294/83 R
[58] Field of Search ................ 59/93, 86; 24/230.5 R, 24/241 P; 294/82 R, 83 R

[56] References Cited

U.S. PATENT DOCUMENTS

| 3,044,521 | 7/1962 | St. Pierre | 24/230.5 |
|---|---|---|---|
| 3,261,636 | 7/1966 | St. Pierre | 59/86 |
| 3,280,438 | 10/1966 | Luketa | 24/230.5 |
| 3,827,746 | 8/1974 | Byers | 294/82 R |
| 3,962,755 | 6/1976 | Buschini | 59/86 |
| 3,974,641 | 8/1976 | Rieger | 59/93 |
| 4,050,730 | 9/1977 | Tada | 294/82 R |

FOREIGN PATENT DOCUMENTS 1407149 9/1975 United Kingdom ........................ 59/86

Primary Examiner—C.W. Lanham
Assistant Examiner—Gene P. Crosby
Attorney, Agent, or Firm—Parmelee, Johnson, Bollinger & Bramblett

[57] ABSTRACT

The invention relates to an eyed hook having a shackle engaged in its eye. The eye has a flattened neck to allow the shackle to be engaged, while the shackle has a slot bridged over by a securing bolt, the width of the slot being greater than the width of the material of the hook constituting the neck, but less than the width of the remainder of the material of the hook constituting the eye. The neck is located where the eye merges into the hook, the neck having a transverse bore to take a locking device which also acts as a bearing for a pivoted safety catch of conventional type.

2 Claims, 3 Drawing Figures

EYED HOOK

The invention relates to an eyed hook with a shackle engaged in its eye, the eye having a flattened neck to allow the shackle to be engaged in the eye while the shackle has a slot bridged over by a securing bolt, the width of the slot being greater than the width of the neck but less than the width of the remainder of the eye.

In a known hook of this general kind the eye has a flattened neck located along its side. This is not entirely satisfactory, in the first place because the neck weakens the eye in a critical region. Furthermore, when the securing bolt has been removed, the shackle can part company entirely from the hook and become lost.

The intention in the present invention is to provide an eyed hook in which the neck is at a location on the eye where the mechanical stresses are less and where a locking device for retaining the shackle can conveniently be installed.

The problem is solved according to the invention in that the neck is located where the eye merges into the hook, the neck having a transverse bore to take a locking device which also acts as a bearing for a pivoted safety catch.

The eyed hook according to the invention has the advantage that the neck of the eye is located at an uncritical location where it does not weaken the eye. Furthermore, locating the neck here makes it possible to arrange a locking device for retaining the shackle after it has been inserted into the eye. And the locking device can also serve as a bearing for a conventional safety catch for the hook.

It has been found advantageous to ensure that the width of the neck of the eye is substantially the same as the width of the chain link which is inserted into the slot of the shackle, the internal width of the chain link being only a little greater than the diameter of the securing bolt of the shackle. This ensures good agreement between the strength of the chain and the strength of the hook to which it is attached.

The invention will now be described in greater detail with the help of the example shown in the drawing, in which.

Figure 1:
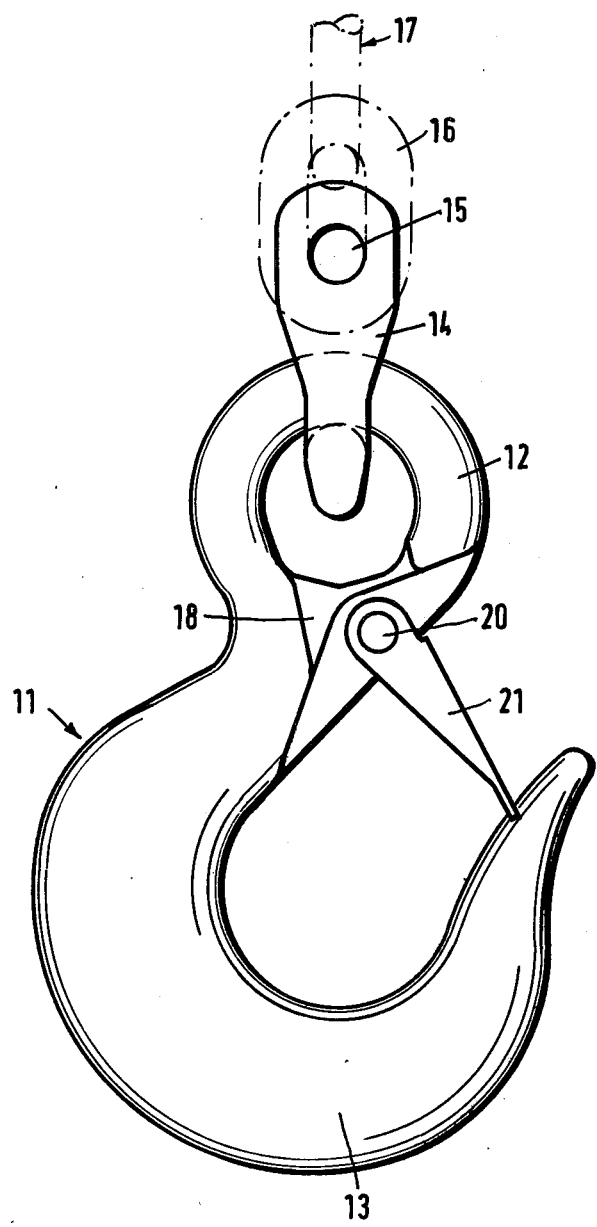
FIG. 1 shows an eyed hook connected to a chain.
Figure 2:
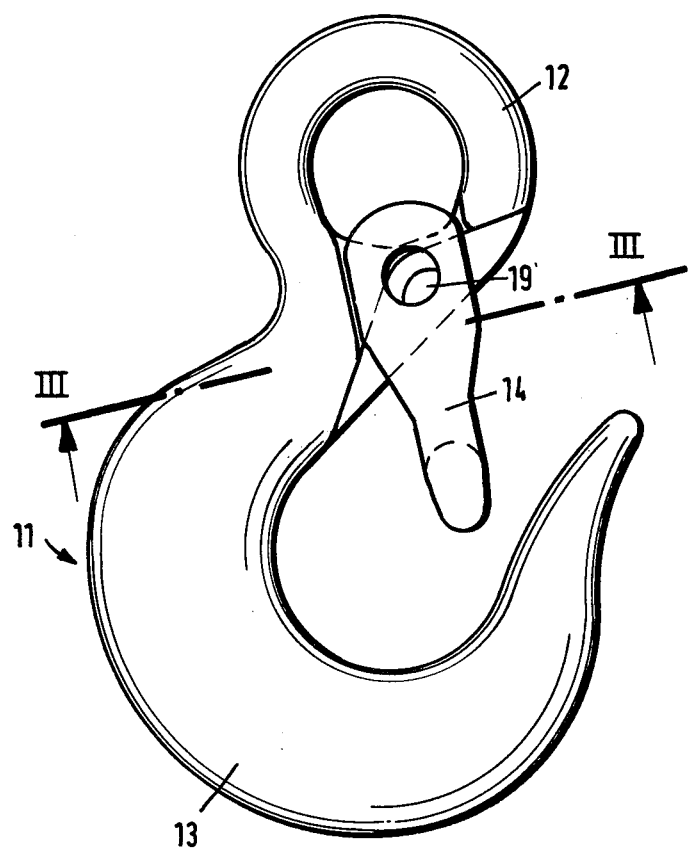
FIG. 2 illustrates the introduction of the shackle into the eye of the hook.

The eyed hook 11 comprises an eye 12 and a hook 13. A shackle 14 is hung into the eye, the shackle having a securing bolt 15 for retaining the connecting link 16 of a chain 17.

Where the eye 12 merges into the hook 13, the eye has a flattened neck 18 containing a transverse bore 19 (compare FIG. 2) to take a locking device 20, in the form of a removable sleeve, on which pivots a spring-loaded catch 21, whose spring is not shown, for safely retaining the load.

Figure 3:
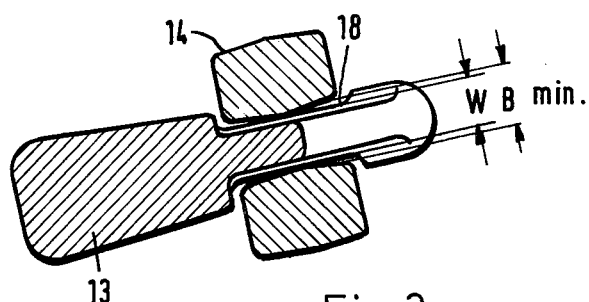
FIG. 3 is a section taken in the plane III—III of FIG. 2.

As shown in FIG. 3, the internal width W of the shackle slot is only slightly greater than the width $B_{min}$ of the flattened neck 18 of the eye.

After the slot of the shackle has been passed over the flattened neck 18, the shackle will be manipulated by rotation in the bend of the eye 12 — the shape of the remainder of the shackle being such as to permit such manipulation — until the shackle and the eye adopt the relative dispositions to one another as shown in FIG. 1.

The slot width W and the diameter of the securing bolt 15 of the shackle together determine the dimensions of the chain link to which the hook can be connected, safely preventing the hook from being attached to a chain of unsuitable mechanical strength.

We claim:

1. An eyed hook with a shackle engaged in its eye, the eye having a flattened neck to allow the shackle to be engaged, while the shackle has a slot bridged over by a securing bolt, the width of the slot being greater than the width of the material of the hook constituting the neck but less than the width of the remainder of the material of the hook constituting the eye, characterised in that the neck is located where the eye merges into the hook, the neck having a transverse bore to take a locking device which also acts as a bearing for a pivoted safety catch.

2. An eyed hook according to claim 1, characterised in that the width of the neck of the eye is substantially the same as the width of a chain link which is inserted into the slot of the shackle, the internal width of the chain link being only a little greater than the diameter of the securing bolt of the shackle.

* * * * *